(12) United States Patent
Kobayashi

(10) Patent No.: US 10,750,105 B2
(45) Date of Patent: Aug. 18, 2020

(54) IMAGING APPARATUS, OPERATION METHOD OF IMAGING APPARATUS, AND OPERATION PROGRAM OF IMAGING APPARATUS

(71) Applicant: FUJIFILM Corporation, Tokyo (JP)

(72) Inventor: Makoto Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/353,627

(22) Filed: Mar. 14, 2019

(65) Prior Publication Data

US 2019/0215470 A1   Jul. 11, 2019

Related U.S. Application Data

(63) Continuation of application No. PCT/JP2017/029200, filed on Aug. 10, 2017.

(30) Foreign Application Priority Data

Sep. 23, 2016   (JP) .................... 2016-185291

(51) Int. Cl.
 *H04N 5/353*   (2011.01)
 *H04N 5/378*   (2011.01)
 *H04N 5/3745*   (2011.01)

(52) U.S. Cl.
 CPC .......... *H04N 5/353* (2013.01); *H04N 5/3532* (2013.01); *H04N 5/378* (2013.01); *H04N 5/37452* (2013.01)

(58) Field of Classification Search
 CPC .... H04N 5/2329; H04N 5/3532; H04N 5/353; H04N 5/37452; H04N 5/378
 See application file for complete search history.

(56) References Cited

U.S. PATENT DOCUMENTS

2006/0157760 A1   7/2006   Hayashi et al.
2009/0167911 A1   7/2009   Takane
(Continued)

FOREIGN PATENT DOCUMENTS

JP   2006-191236 A   7/2006
JP   2009-159459 A   7/2009
(Continued)

OTHER PUBLICATIONS

International Preliminary Report on Patentability and Written Opinion of the International Searching Authority (forms PCT/IB/373, PCT/ISA/237 and PCT/IB/326), dated Apr. 4, 2019, for corresponding International Application No. PCT/JP2017/029200, with a Written Opinion translation.
(Continued)

*Primary Examiner* — Sinh Tran
*Assistant Examiner* — Selam T Gebriel
(74) *Attorney, Agent, or Firm* — Birch, Stewart, Kolasch & Birch, LLP

(57) ABSTRACT

Provided are an imaging apparatus capable of preventing deterioration in quality of a captured image to be captured in a case where imaging is performed by using the driving according to the global shutter method and the driving according to the rolling shutter method in combination, an operation method thereof, and an operation program thereof. The digital camera includes an imaging element 5 that has a plurality of pixels 61 each including a photoelectric conversion element 61A and a charge holding section 61B, and a driving controller 11A that performs driving control of the imaging element 5 according to a global shutter method while continuously performing driving control of the imaging element 5 according to a rolling shutter method. The driving controller 11A makes a first time, which is necessary for reading a signal obtained from one of pixel rows 62
(Continued)

under the driving control according to the rolling shutter method, longer than a second time which is necessary for reading the signal obtained from one of the pixel rows 62 under the driving control according to the global shutter method.

17 Claims, 7 Drawing Sheets

(56) References Cited

U.S. PATENT DOCUMENTS

| | | | |
|---|---|---|---|
| 2009/0303362 A1* | 12/2009 | Ebihara | H04N 5/353 348/296 |
| 2014/0139713 A1 | 5/2014 | Gomi et al. | |
| 2016/0112626 A1* | 4/2016 | Shimada | H04N 5/347 348/349 |
| 2016/0134824 A1 | 5/2016 | Gomi et al. | |
| 2018/0124347 A1 | 5/2018 | Gomi et al. | |

FOREIGN PATENT DOCUMENTS

| | | |
|---|---|---|
| JP | 2012-4819 A | 1/2012 |
| JP | 2012-10074 A | 1/2012 |
| JP | 2012-129817 A | 7/2012 |
| JP | 2012-248952 A | 12/2012 |
| JP | 2013-98792 A | 5/2013 |
| JP | 2014-27520 A | 2/2014 |

OTHER PUBLICATIONS

International Search Report (form PCT/ISA/210), dated Oct. 31, 2017, for corresponding International Application No. PCT/JP2017/029200, with an English translation.

* cited by examiner

IMAGING APPARATUS, OPERATION METHOD OF IMAGING APPARATUS, AND OPERATION PROGRAM OF IMAGING APPARATUS

CROSS REFERENCE TO RELATED APPLICATION

This is a continuation of International Application No. PCT/JP2017/029200 filed on Aug. 10, 2017, and claims priority from Japanese Patent Application No. 2016-185291 filed on Sep. 23, 2016, the entire disclosures of which are incorporated herein by reference.

BACKGROUND OF THE INVENTION

1. Field of the Invention

The present invention relates to an imaging apparatus, an operation method of the imaging apparatus, and a computer readable medium storing an operation program of the imaging apparatus.

2. Description of the Related Art

Recently, there has been a rapid increase in the demand for electronic devices having imaging functions such as electronic endoscopes, digital still cameras, digital video cameras, or mobile phones equipped with cameras, in accordance with an increase in resolution of imaging elements such as electric charge coupled device (CCD) image sensors and complementary metal oxide semiconductor (CMOS) image sensors. It should be noted that electronic devices having the above-mentioned imaging functions are referred to as imaging apparatuses.

In some MOS type imaging elements, pixels are two-dimensionally arranged. Each pixel includes a photoelectric conversion element, a charge holding section that holds an electric charge generated and accumulated in the photoelectric conversion element, and a reading circuit that reads a voltage signal, which corresponds to the electric charge held in the charge holding section, to a signal line. Such an imaging element is able to perform the driving of the global shutter method and the driving of the rolling shutter method.

The global shutter method is as follows. The photoelectric conversion elements of all the pixels are simultaneously reset, and the exposure is simultaneously started for all the pixels. Thereafter, the electric charges accumulated in the photoelectric conversion elements of the respective pixels are simultaneously transferred to the charge holding sections, and the exposure is simultaneously terminated for all the pixels. Then, the electric charges accumulated in the charge holding sections are sequentially converted into voltage signals for each pixel row and read to the signal lines.

The rolling shutter method is as follows. The photoelectric conversion elements in a pixel row are reset, and exposure of this pixel row starts. Thereafter, the electric charges accumulated in the photoelectric conversion elements in this pixel row are transferred to the charge holding sections, and the exposure is terminated. The driving operations for reading voltage signals corresponding to the electric charges held in the charge holding sections to the signal lines are sequentially performed while the pixel rows are changed.

Further, in a case of the MOS type imaging element in which the above-mentioned charge holding sections are removed, it is possible to perform the driving according to the rolling shutter method and the driving according to the global reset method.

The global reset method is as follows. The photoelectric conversion elements of all the pixels are simultaneously reset, and the exposure is simultaneously started for all the pixels. Thereafter, by closing the mechanical shutter disposed in front of the light-receiving surface, and the exposure is simultaneously terminated for all the pixels. Then, the electric charges accumulated in the photoelectric conversion elements are sequentially converted into voltage signals for each pixel row, and the signals are read to the signal line.

JP2006-191236A and JP2013-098792A each describe an imaging apparatus that drives an imaging element through the global reset method at the imaging for recording and drives an imaging element through the rolling shutter method at the imaging for live view display.

JP2012-129817A and JP2012-004819A each describe an imaging apparatus that drives an imaging element through the global shutter method at the imaging for recording and drives the imaging element through the rolling shutter method at imaging time for live view display.

JP2009-159459A describes an imaging apparatus that drives an imaging element through either the global shutter method or the rolling shutter method at the imaging for recording and drives the imaging element through the rolling shutter method at the imaging for live view display.

SUMMARY OF THE INVENTION

In JP2006-191236A, JP2013-098792A, JP2012-129817A, JP2012-004819A, and JP2009-159459A, the following features are described. At the imaging for recording, the imaging element is driven through the global shutter method or the global reset method. At the imaging for live view display, the imaging element is driven through the rolling shutter method. According to the configuration, at the imaging for live view display, drawing of the live view image can be started on the basis of the voltage signals from the pixel rows of which the exposure operations sequentially end. Therefore, it is possible to shorten the time from when the subject is imaged until the live view image of the subject is displayed.

In a case of an imaging element comprising pixels each including a charge holding section, in the rolling shutter method, for each pixel row, it is necessary to perform a step of transferring electric charges from the photoelectric conversion elements to the charge holding sections and a step of transferring electric charges from the charge holding sections to the reading circuits.

On the other hand, in the global shutter method, a step of simultaneously transferring electric charges from the photoelectric conversion elements to the charge holding sections in all pixels and then transferring the electric charges from the charge holding sections to the reading circuits for each pixel row is performed.

Therefore, in order to set the frame rate to be the same between the case of imaging by driving the imaging element through the global shutter method and the case of imaging by driving the imaging element through the rolling shutter method, at the driving of the rolling shutter method, the time of electric charge transfer from the charge holding sections to the reading circuits is shortened. Consequently, residual electric charges after the transfer from the charge holding sections to the reading circuits are generated, and thus the quality of the live view image deteriorates.

In JP2006-191236A and JP2013-098792A, it is a premise that the imaging element does not include the charge holding section, and a problem about deterioration in live view image quality is not considered.

In JP2012-129817A, JP2012-004819A, and JP2009-159459A, deterioration in live view image quality is not considered in a case where imaging is performed using the driving according to the global shutter method and the driving according to the rolling shutter method in combination.

The present invention has been made in consideration of the above-mentioned situations, and it is an object of the present invention to provide an imaging apparatus capable of preventing deterioration in quality of a captured image in a case where imaging is performed using the driving according to the global shutter method and the driving according to the rolling shutter method in combination, an operation method thereof, and an operation program thereof.

According to an embodiment of the present invention, there is provided an imaging apparatus comprising: a MOS type imaging element that has a plurality of pixels each including a photoelectric conversion element and a charge holding section, which holds an electric charge generated by the photoelectric conversion element and from which a signal corresponding to the electric charge is read by a reading circuit, and includes a plurality of pixel rows each consisting of a plurality of the pixels arranged in one direction; and a driving controller that selectively performs driving control according to a global shutter method of simultaneously resetting the respective photoelectric conversion elements of the plurality of pixels to start exposure of the plurality of pixels, simultaneously transferring electric charges accumulated in the respective photoelectric conversion elements of the plurality of pixels to the charge holding sections to terminate the exposure, and sequentially reading signals corresponding to the electric charges held in the charge holding section for each of the pixel rows, and driving control according to a rolling shutter method of resetting the photoelectric conversion elements in the pixel rows to start exposure of the photoelectric conversion elements in the pixel rows, transferring electric charges accumulated in the photoelectric conversion elements of the pixel rows to the charge holding sections to terminate the exposure, and sequentially performing driving for reading signals corresponding to the electric charges held in the charge holding sections while changing the pixel rows. In an imaging mode for performing the driving control according to the global shutter method while continuously performing the driving control according to the rolling shutter method, the driving controller makes a first time, which is necessary for reading the signal obtained from one of the pixel rows under the driving control according to the rolling shutter method, longer than a second time which is necessary for reading the signal obtained from one of the pixel rows under the driving control according to the global shutter method.

According to an embodiment of the present invention, there is provided an operation method of the imaging apparatus including a MOS type imaging element that has a plurality of pixels each including a photoelectric conversion element and a charge holding section, which holds an electric charge generated by the photoelectric conversion element and from which a signal corresponding to the electric charge is read by a reading circuit, and includes a plurality of pixel rows each consisting of a plurality of the pixels arranged in one direction. The method comprises a driving control step of selectively performing driving control according to a global shutter method of simultaneously resetting the respective photoelectric conversion elements of the plurality of pixels to start exposure of the plurality of pixels, simultaneously transferring electric charges accumulated in the respective photoelectric conversion elements of the plurality of pixels to the charge holding sections to terminate the exposure, and sequentially reading signals corresponding to the electric charges held in the charge holding section for each of the pixel rows, and driving control according to a rolling shutter method of resetting the photoelectric conversion elements in the pixel rows to start exposure of the photoelectric conversion elements in the pixel rows, transferring electric charges accumulated in the photoelectric conversion elements of the pixel rows to the charge holding sections to terminate the exposure, and sequentially performing driving for reading signals corresponding to the electric charges held in the charge holding sections while changing the pixel rows. In an imaging mode for performing the driving control according to the global shutter method while continuously performing the driving control according to the rolling shutter method, in the driving control step, a first time, which is necessary for reading the signal obtained from one of the pixel rows under the driving control according to the rolling shutter method, is made longer than a second time which is necessary for reading the signal obtained from one of the pixel rows under the driving control according to the global shutter method.

According to an embodiment of the present invention, there is provided an operation program of the imaging apparatus including a MOS type imaging element that has a plurality of pixels each including a photoelectric conversion element and a charge holding section, which holds an electric charge generated by the photoelectric conversion element and from which a signal corresponding to the electric charge is read by a reading circuit, and includes a plurality of pixel rows each consisting of a plurality of the pixels arranged in one direction. The program causes a computer to execute a driving control step of selectively performing driving control according to a global shutter method of simultaneously resetting the respective photoelectric conversion elements of the plurality of pixels to start exposure of the plurality of pixels, simultaneously transferring electric charges accumulated in the respective photoelectric conversion elements of the plurality of pixels to the charge holding sections to terminate the exposure, and sequentially reading signals corresponding to the electric charges held in the charge holding section for each of the pixel rows, and driving control according to a rolling shutter method of resetting the photoelectric conversion elements in the pixel rows to start exposure of the photoelectric conversion elements in the pixel rows, transferring electric charges accumulated in the photoelectric conversion elements of the pixel rows to the charge holding sections to terminate the exposure, and sequentially performing driving for reading signals corresponding to the electric charges held in the charge holding sections while changing the pixel rows. In an imaging mode for performing the driving control according to the global shutter method while continuously performing the driving control according to the rolling shutter method, in the driving control step, a first time, which is necessary for reading the signal obtained from one of the pixel rows under the driving control according to the rolling shutter method, is made longer than a second time which is necessary for reading the signal obtained from one of the pixel rows under the driving control according to the global shutter method.

According to the embodiments of the present invention, there are provided an imaging apparatus capable of preventing deterioration in quality of a captured image to be captured in a case where imaging is performed by using the driving according to the global shutter method and the driving according to the rolling shutter method in combination, an operation method thereof, and an operation program thereof.

DESCRIPTION OF THE PREFERRED EMBODIMENTS

Hereinafter, embodiments of the present invention will be described with reference to the drawings.

Figure 1:
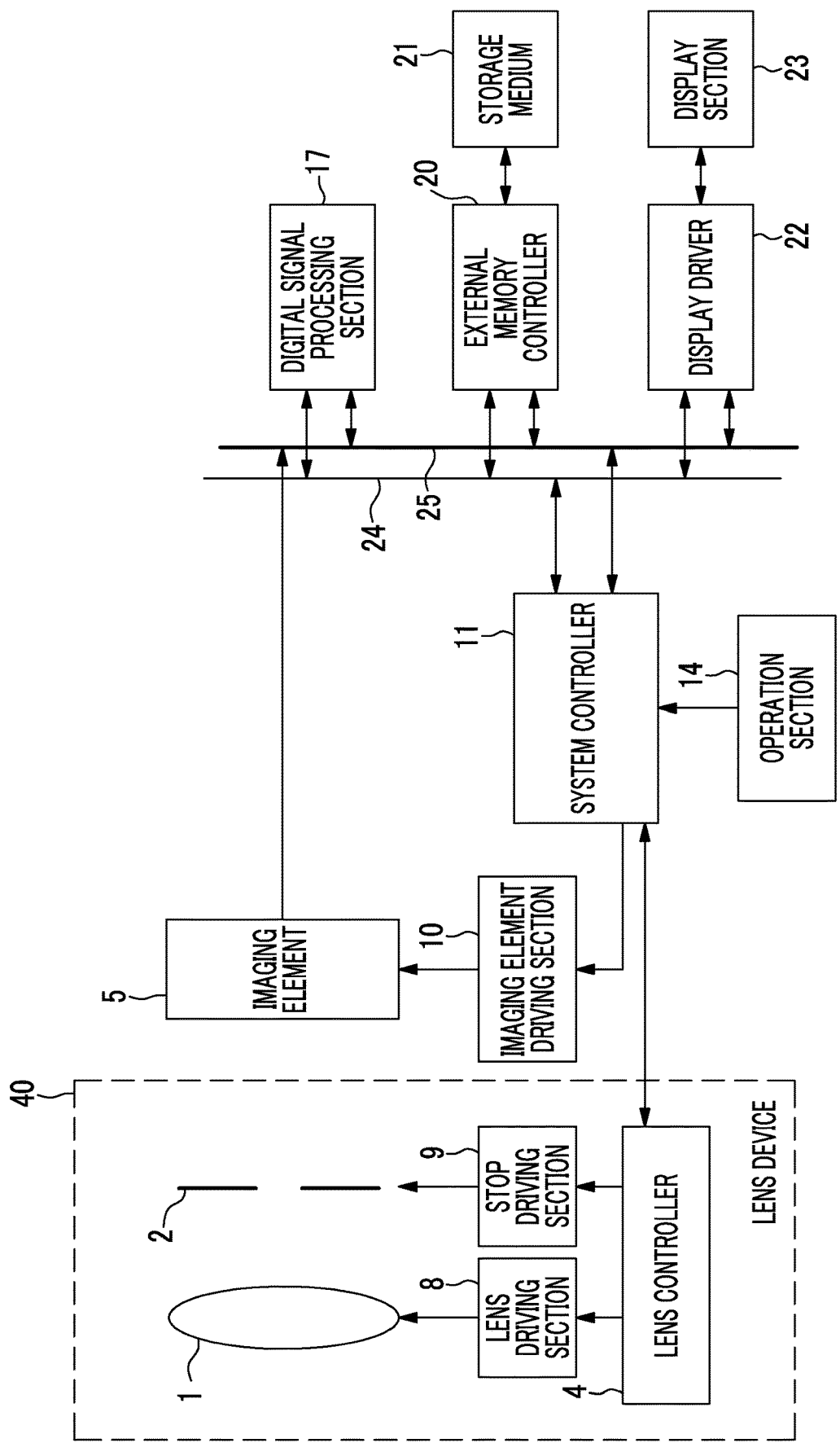
FIG. 1 is a diagram illustrating a schematic configuration of a digital camera as an example of an imaging apparatus for explaining an embodiment of the present invention.

FIG. 1 is a diagram illustrating a schematic configuration of a digital camera as an example of an imaging apparatus for explaining an embodiment of the present invention.

The digital camera illustrated in FIG. 1 comprises a lens device 40 having an imaging lens 1, a stop 2, a lens controller 4, a lens driving section 8, and a stop driving section 9.

In description of the present embodiment, the lens device 40 is attachable to and detachable from a digital camera body, but may be fixed to the digital camera body. The imaging lens 1 and the stop 2 compose an imaging optical system.

The lens controller 4 of the lens device 40 is configured to be capable of communicating with the system controller 11 of the digital camera body through wire or wireless.

In accordance with a command from the system controller 11, the lens controller 4 drives the focus lens included in the imaging lens 1 through the lens driving section 8, and drives the stop 2 through the stop driving section 9.

The digital camera body includes: a MOS type imaging element 5 such as a CMOS image sensor that captures an image of a subject through an imaging optical system; an imaging element driving section 10 that drives the imaging element 5; a system controller 11 that integrally controls an entire electric control system of the digital camera; an operation section 14; a digital signal processing section 17; an external memory controller 20 to which a removable storage medium 21 is connected; and a display driver 22 that drives an display section 23 such as a liquid crystal display (LCD) or an organic electro luminescence (EL) display mounted on the back side of the camera.

The system controller 11 is configured to include various processors, a random access memory (RAM), and a read only memory (ROM), thereby totally controlling the entire digital camera.

Various kinds of processors include a programmable logic device (PLD) that is a processor capable of changing a circuit configuration after manufacturing of a central processing unit (CPU), a field programmable gate array (FPGA), or the like as a general-purpose processor that performs various kinds of processing by executing programs, a dedicated electric circuit that is a processor having a circuit configuration designed exclusively for executing specific processing of an application specific integrated circuit (ASIC) or the like, and the like.

More specifically, a structure of these various processors is an electric circuit in which circuit elements such as semiconductor elements are combined.

The processor of the system controller 11 may be configured as one of various processors, or may be configured as a combination of two or more of the same or different kinds of processors (for example, a combination of a plurality of FPGAs or a combination of a CPU and an FPGA).

The processor of the system controller 11 implements each function described later by executing the operation program stored in the ROM built into the system controller 11.

The digital signal processing section 17 includes the above-mentioned various processors, RAM, and ROM, and executes various kinds of processing by executing the program stored in the ROM.

The digital signal processing section 17 performs processing such as interpolation calculation, gamma correction calculation, and RGB/YC conversion processing on the imaging signal which is output from the imaging element 5. Thereby, live view image data for display on the display section 23 and captured image data for storage in the storage medium 21 are generated.

The digital signal processing section 17, the external memory controller 20, and the display driver 22 are connected to one another through the control bus 24 and the data bus 25, and operate on the basis of a command from the system controller 11.

Figure 2:
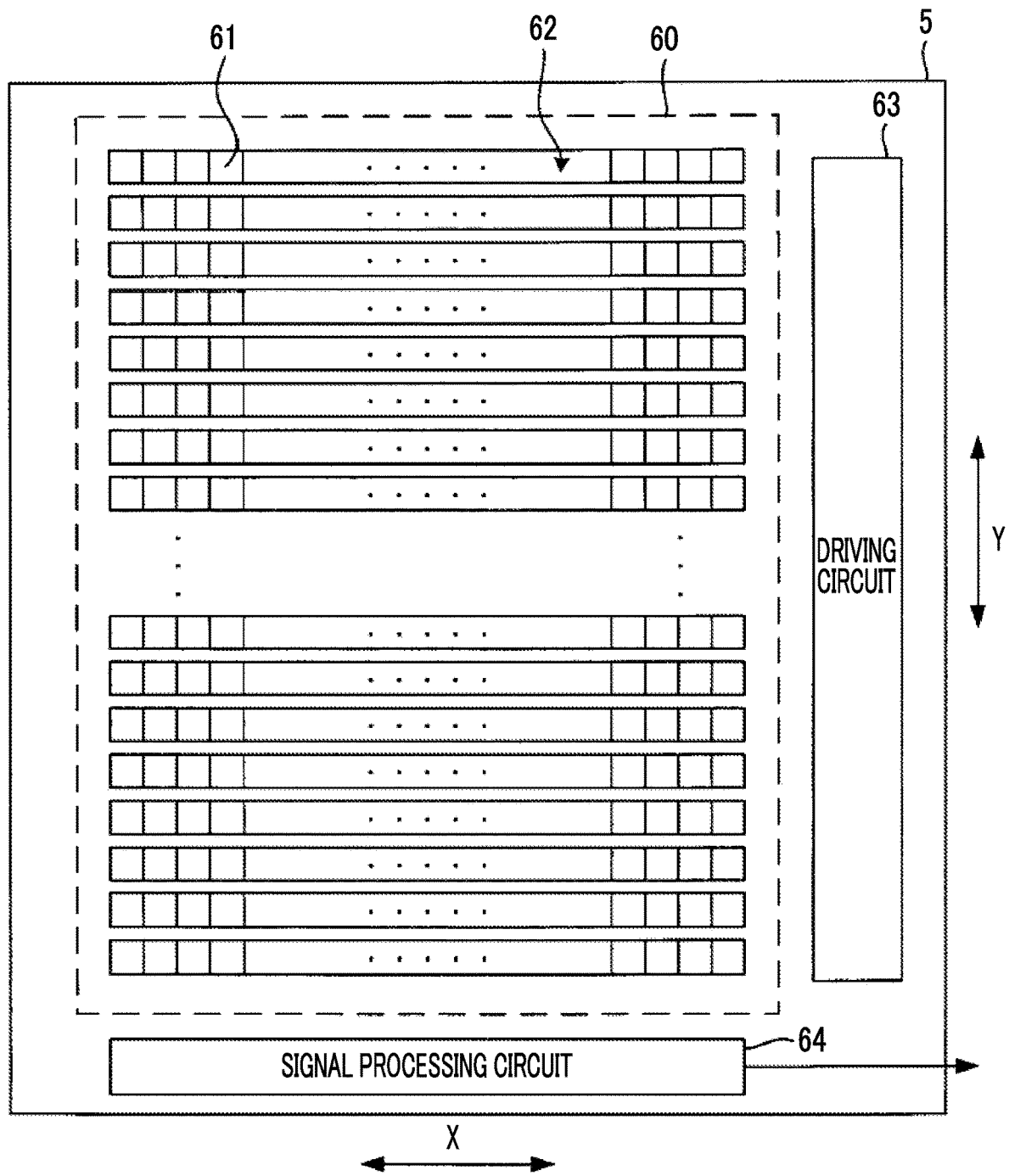
FIG. 2 is a schematic plan view illustrating a schematic configuration of the imaging element 5 illustrated in FIG. 1.
Figure 3:
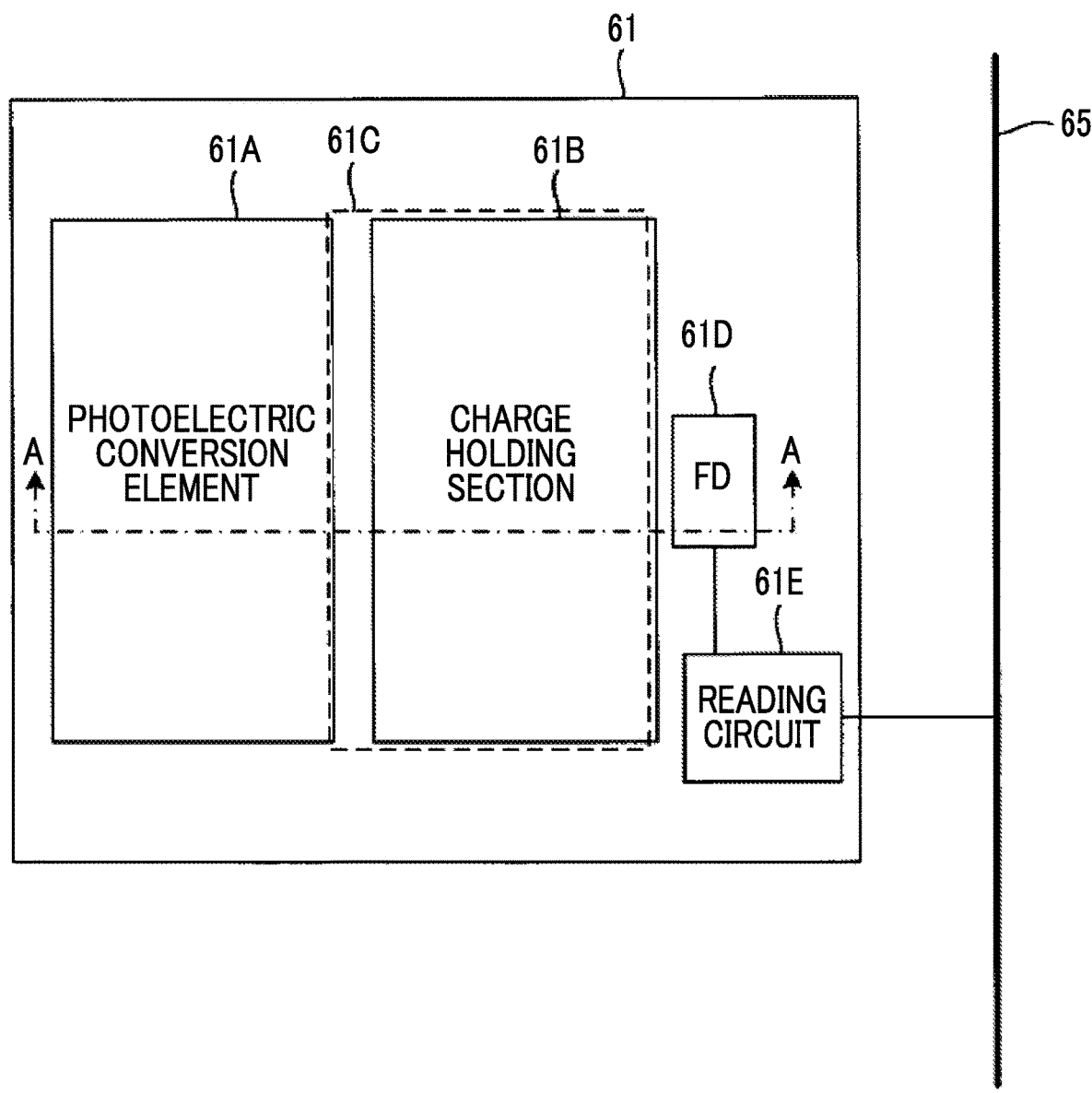
FIG. 3 is a schematic plan view illustrating a schematic configuration of a pixel 61 of the imaging element 5 illustrated in FIG. 2.

FIG. 2 is a schematic plan view illustrating a schematic configuration of the imaging element 5 illustrated in FIG. 1. FIG. 3 is a schematic plan view illustrating a schematic configuration of a pixel 61 of the imaging element 5 illustrated in FIG. 2. 4 is a schematic cross-sectional view taken along the line A-A of the pixel 61 of the imaging element 5 illustrated in FIG. 3.

The imaging element 5 comprises: a light-receiving surface 60 on which a plurality of pixel rows 62 consisting of a plurality of pixels 61 arranged in a row direction X which is one direction are arranged in a column direction Y orthogonal to the row direction X; a driving circuit 63 that drives the pixels 61 arranged on the light-receiving surface 60; and a signal processing circuit 64 that processes imaging signals which are read to signal lines from the respective pixels 61 of the pixel rows 62 arranged on the light-receiving surface 60.

In FIG. 2, the upper end of the light-receiving surface 60 in the column direction Y is referred to as the upper end, and the lower end of the light-receiving surface 60 in the column direction Y is referred to as the lower end.

As illustrated in FIG. 3, the pixel 61 includes a photoelectric conversion element 61A, a charge holding section 61B, a charge transfer section 61C, a floating diffusion 61D, and a reading circuit 61E formed on a semiconductor substrate.

The photoelectric conversion element 61A receives the light that has passed through the imaging optical system of the lens device 40, and generates and accumulates electric charge corresponding to the amount of received light. The photoelectric conversion element 61A is composed of a photodiode or the like.

The charge transfer section 61C transfers the electric charge accumulated in the photoelectric conversion element 61A to the charge holding section 61B. The charge transfer section 61C is composed of an impurity region in the semiconductor substrate and an electrode formed above the impurity region.

A voltage applied to the electrodes composing the charge transfer section 61C is controlled by the driving circuit 63, whereby the electric charge is transferred from the photoelectric conversion element 61A to the charge holding section 61B.

The charge holding section 61B holds the electric charge transferred from the photoelectric conversion element 61A by the charge transfer section 61C. The charge holding section 61B is composed of the impurity region in the semiconductor substrate.

The floating diffusion 61D is for converting electric charges into voltage, and electric charges held in the charge holding section 61B are transferred thereto.

The reading circuit 61E is a circuit that reads a signal corresponding to the electric potential of the floating diffusion 61D to the signal line 65 as an imaging signal. The reading circuit 61E is driven by the driving circuit 63.

Figure 4:
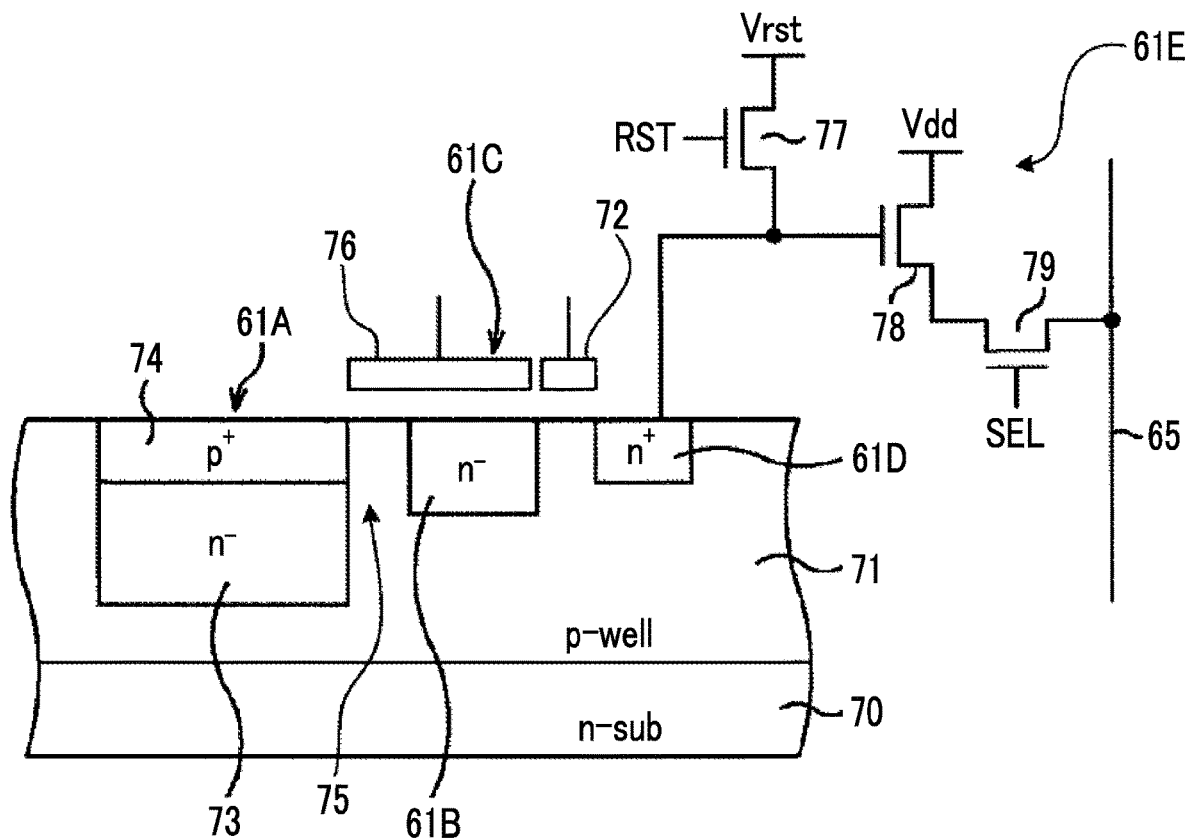
FIG. 4 is a schematic cross-sectional view taken along the line A-A of the pixel 61 of the imaging element 5 illustrated in FIG. 3.

As illustrated in FIG. 4, a P well layer 71 is formed on the surface of an N-type substrate 70, and the photoelectric conversion element 61A is formed on the surface portion of the P well layer 71. The photoelectric conversion element 61A is composed of an N-type impurity layer 73 and a P-type impurity layer 74 formed thereon. The N-type substrate 70 and the P well layer 71 compose the semiconductor substrate.

The charge holding section 61B consisting of an N-type impurity layer is formed slightly away from the photoelectric conversion element 61A on the surface portion of the P well layer 71. A transfer electrode 76 is formed above the region 75 of the P well layer 71 between the charge holding section 61B and the photoelectric conversion element 61A with an oxide film which is interposed therebetween and not shown.

The region 75 and the transfer electrode 76 compose a charge transfer section 61C. In the example of FIG. 4, the transfer electrode 76 is formed up to the upper side of the charge holding section 61B, but the transfer electrode 76 may be formed at least above the region 75. By controlling the electric potential of the transfer electrode 76 to form a channel in the region 75, it is possible to transfer the electric charge accumulated in the photoelectric conversion element 61A to the charge holding section 61B. The potential of the transfer electrode 76 is controlled by the driving circuit 63.

The floating diffusion 61D consisting of an N-type impurity layer is formed slightly away from the charge holding section 61B on the surface portion of the P well layer 71. A reading electrode 72 is formed above the P well layer 71 between the charge holding section 61B and the floating diffusion 61D with an oxide film which is interposed therebetween and not shown.

By controlling the electric potential of the reading electrode 72 to form a channel in the region between the charge holding section 61B and the floating diffusion 61D, the electric charges held in the charge holding section 61B can be transferred to the floating diffusion 61D. The potential of the reading electrode 72 is controlled by the driving circuit 63.

In the example illustrated in FIG. 4, the reading circuit 61E is composed of a reset transistor 77 that is for resetting the electric potential of the floating diffusion 61D, an output transistor 78 that converts the electric potential of the floating diffusion 61D into an imaging signal and outputs the signal, and a selection transistor 79 that is for selectively reading the output imaging signal, which is output from the output transistor 78, to the signal line 65. The configuration of the reading circuit is an example, and the present invention is not limited thereto.

It should be noted that the reading circuit 61E may be shared by a plurality of pixels 61.

The driving circuit 63 illustrated in FIG. 2 independently drives the transfer electrodes 76, the reading electrodes 72, and the reading circuit 61E of each pixel 61 for each pixel row 62, thereby performing resetting (discharge of the electric charge accumulated in the photoelectric conversion element 61A) of each photoelectric conversion element 61A included in the pixel row 62, reading of the imaging signal corresponding to the electric charge accumulated in each photoelectric conversion element 61A to the signal line 65, and the like.

Further, the driving circuit 63 simultaneously drives the charge transfer sections 61C of all the pixels 61 so as to simultaneously transfer electric charges from the photoelectric conversion elements 61A of the respective pixels 61 to the charge holding sections 61B.

In addition, the driving circuit 63 drives the charge transfer sections 61C of the respective pixels 61 on a pixel row basis so as to independently transfer the electric charges from the photoelectric conversion elements 61A of the respective pixels 61 in the pixel row 62 to the charge holding section 61B for each pixel row 62. The driving circuit 63 is controlled by the imaging element driving section 10.

The photoelectric conversion element 61A is reset by resetting the floating diffusion 61D by the reset transistor 77 in a state where the charge transfer section 61C is set to be able to transfer the electric charge and a channel is formed in the semiconductor substrate under the reading electrode 72.

The signal processing circuit 64 illustrated in FIG. 2 performs correlative double sampling processing on the imaging signal read from each pixel 61 of the pixel row 62 to the signal line 65, converts the imaging signal subjected to the correlative double sampling processing into digital signal, and outputs the signal to the data bus 25. The signal processing circuit 64 is controlled by the imaging element driving section 10.

Figure 5:
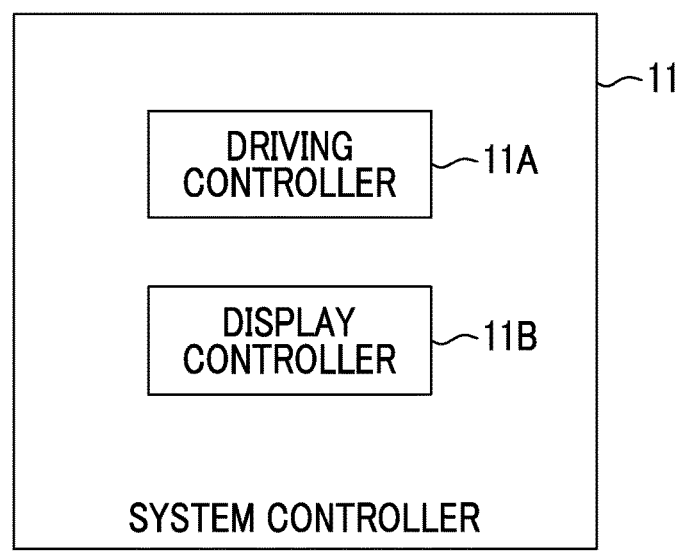
FIG. 5 is a diagram illustrating functional blocks of the system controller 11 illustrated in FIG. 1.

FIG. 5 is a diagram illustrating functional blocks of the system controller 11 illustrated in FIG. 1.

In the system controller 11, the processor, which has executed the operation program, functions as the driving controller 11A and the display controller 11B.

The driving controller 11A selectively performs driving control according to the global shutter method and driving control according to the rolling shutter method in the still imaging mode for performing still image recording.

The driving control according to the global shutter method is control for simultaneously resetting the photoelectric conversion elements 61A of all the pixels 61 on the light-receiving surface 60 and simultaneously starting exposure of all the pixels 61 by controlling the driving circuit 63 through the imaging element driving section 10, thereafter simultaneously transferring the electric charges accumulated in the respective photoelectric conversion elements 61A of all the pixels 61 to the charge holding sections 61B to terminate the exposure of all the pixels 61, and after the termination of the exposure, sequentially reading the imaging signals corresponding to the electric charges held in the charge holding sections 61B to the signal lines 65 for each pixel row 62.

The driving control according to the rolling shutter method is control for resetting the photoelectric conversion elements 61A in the pixel row 62 and starting the exposure of the photoelectric conversion elements 61A in the pixel row 62 by controlling the driving circuit 63 through the imaging element driving section 10, thereafter transferring the electric charges accumulated in the photoelectric conversion elements 61A of the pixel row 62 to the charge holding sections 61B to terminate the exposure, and sequentially performing the driving operations of reading the imaging signals, which corresponds to the electric charges held in the charge holding sections 61B, to the signal lines 65 while changing the pixel rows 62.

The driving controller 11A continuously performs the driving control according to the rolling shutter method in a case where the above-mentioned still imaging mode which is one of the imaging modes of the digital camera is set, and performs the driving control according to the global shutter method in response to an imaging instruction in a case where the imaging instruction for the still image recording is issued while the driving control according to the rolling shutter method is performed.

In the still imaging mode, the driving controller 11A makes a first time longer than a second time. The first time is necessary for reading the imaging signal from one pixel row 62 to the signal line 65 under the driving control according to the rolling shutter method. The second time is necessary for reading the imaging signal from one pixel row 62 to the signal line 65 under the driving control according to the global shutter method.

The time necessary for reading the imaging signal from one pixel row 62 to the signal line 65 is a time taken for electric charge transfer from the charge holding section 61B included in each pixel 61 of this pixel row 62 to the floating diffusion 61D.

That is, the time during which the channel for electric charge transfer is formed by the reading electrode 72 included in each pixel 61 of one pixel row 62 is the first time or the second time described above.

Here, the first time is set as a lower limit value of a period of time during which the amount of the residual electric charge of the charge holding section 61B does not affect the imaging quality in a state in which the electric charge is completely transferred from the charge holding section 61B to the floating diffusion 61D (idealistically, a time during which the electric charge of the charge holding section 61B is completely transferred and the amount of the residual electric charge becomes zero).

In the still imaging mode, the digital signal processing section 17 processes the imaging signals output from the imaging element 5 through the driving control according to the global shutter method, and generates the captured image data for recording and the live view image data for displaying a live view image.

Likewise, in the still imaging mode, the digital signal processing section 17 processes the imaging signals output from the imaging element 5 through the driving control according to the rolling shutter method, thereby generating live view image data.

The live view image data is composed of a large number of pixel data pieces. In the live view image data, a plurality of pixel data rows consisting of a plurality of pixel data pieces arranged in the same direction as the row direction X are arranged in a direction orthogonal to this direction.

The digital signal processing section 17 has a plurality of line memories for storing imaging signal groups which are output from different pixel rows 62, and sequentially generates the pixel data rows on the basis of the imaging signal groups stored in the line memories and sequentially transmits the generated pixel data rows to the system controller 11.

The display controller 11B sequentially inputs the pixel data rows of the live view image data, which is generated by the digital signal processing section 17, to the display driver 22, and causes the display section 23 to display the live view image based on the live view image data by using the display driver 22.

The display section 23 has a display surface in which a plurality of display pixel rows consisting of a plurality of display pixels arranged in the same direction as the row direction X are arranged in a direction orthogonal to this direction.

The display driver 22 draws one line of the live view image, which is based on the pixel data row input from the display controller 11B, on one display pixel row of the display section 23.

Every time a pixel data row is input, the display driver 22 draws all lines of the live view image by shifting the drawing destination of one line of the live view image based on this pixel data row one by one.

In a case where driving control according to the global shutter method is performed in the still imaging mode, the display controller 11B sets a drawing time, which is the time necessary for drawing the one line of the live view image on the display section 23 through the display driver 22, as the above second time.

In a case where the driving control according to the rolling shutter method is performed in the still imaging mode, the display controller 11B sets the drawing time on the basis of the above-mentioned first time. Specifically, the display controller 11B sets the drawing time substantially equal to the first time.

In the present specification, the expression that "the two times are substantially equal" means that a ratio of the difference between these two times to each of these two times is equal to or less than 10%.

The operation of the digital camera configured as described above in the still imaging mode will be described.

Figure 6:
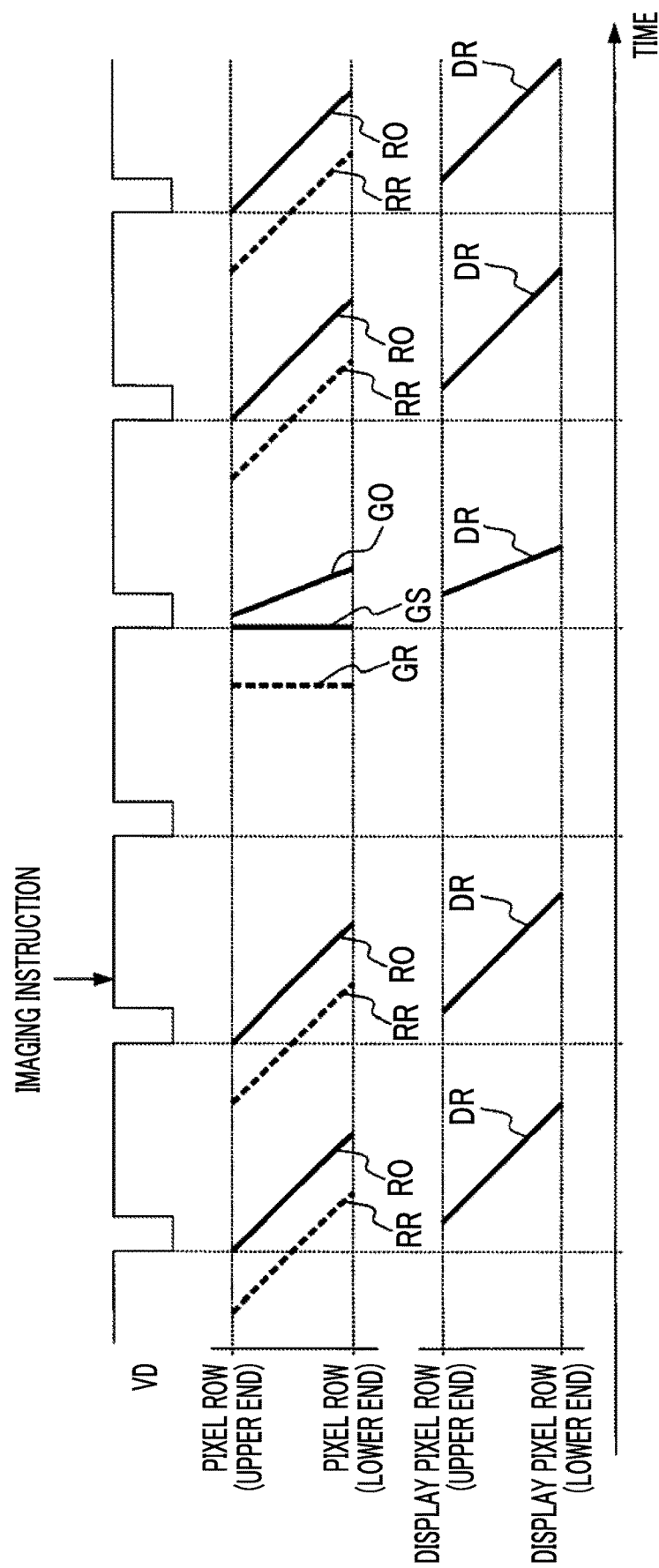
FIG. 6 is a timing chart illustrating the operation in the still imaging mode of the digital camera illustrated in FIG. 1.

FIG. 6 is a timing chart illustrating the operation in the still imaging mode of the digital camera illustrated in FIG. 1.

In FIG. 6, the horizontal axis indicates time. In the upper part of FIG. 6, the vertical synchronization signal VD is shown.

In the middle part of FIG. 6, the drive timing of each pixel row 62 on the light-receiving surface 60 of the imaging element 5 is shown. In the middle part of FIG. 6, the vertical axis indicates the position of the pixel row 62 in the column direction Y.

The straight lines RR and the straight line GR illustrated in the middle part of FIG. 6 indicate timings at which the photoelectric conversion elements 61A included in the pixel row 62 are reset.

The straight lines RO illustrated in the middle part of FIG. 6 indicate timings at which electric charges are transferred from the photoelectric conversion elements 61A included in the pixel row 62 to the floating diffusions 61D through the charge holding sections 61B.

The straight line GS illustrated in the middle part of FIG. 6 indicates a timing at which electric charges are transferred from the photoelectric conversion elements 61A included in the pixel row 62 to the charge holding sections 61B.

The straight line GO illustrated in the middle stage of FIG. 6 indicates a timing at which electric charges are transferred from the charge holding sections 61B included in the pixel row 62 to the floating diffusions 61D.

In the lower part of FIG. 6, the drawing state of the display section 23 is shown. In the lower part of FIG. 6, the vertical axis indicates the position of the display pixel row of the display section 23.

The straight lines DR illustrated in the lower part of FIG. 6 indicate the timings at which drawing is performed on the display pixel rows on the display surface.

In a case where the still imaging mode is set, the driving control according to the rolling shutter method starts through the driving controller 11A.

In a case where the driving control according to the rolling shutter method starts, the pixel rows 62 are sequentially selected from the upper end side to the lower end side of the light-receiving surface 60 as indicated by the straight lines RR, and the photoelectric conversion elements 61A in the selected pixel rows 62 are reset. As a result, exposure starts at different timing for each pixel row 62.

In a case where a predetermined exposure time has elapsed, as indicated by the straight lines RO, the pixel rows 62 are sequentially selected from the upper end side to the lower end side of the light-receiving surface 60, for example, at a ratio of one to four. Then, in the selected pixel rows 62, electric charges are transferred from the photoelectric conversion elements 61A to the charge holding sections 61B, and electric charges are transferred from the charge holding sections 61B to the floating diffusions 61D. As a result, the imaging signals, which are read from the selected pixel rows 62, are output to the data bus 25.

In a case where the pixel data rows are generated by the digital signal processing section 17 on the basis of the imaging signals output to the data bus 25, as indicated by the straight lines DR, the live view image is drawn one line at a time sequentially from the upper end side of the display surface.

The above processing is repeatedly performed in synchronization with the vertical synchronization signal VD until the imaging instruction is issued.

Then, for example, in a case where the imaging instruction is issued after the second falling edge of the vertical synchronization signal VD, the driving control according to the global shutter method starts after the third falling edge of the vertical synchronization signal VD.

In this driving control, the photoelectric conversion elements 61A are simultaneously reset for all the pixel rows 62 as indicated by the straight line GR. As a result, exposure of all the pixel rows 62 starts at the same timing.

Thereafter, in a case where a predetermined exposure time has elapsed, electric charges are simultaneously transferred from the photoelectric conversion elements 61A to the charge holding sections 61B in all the pixel rows 62, as indicated by the straight line GS. As a result, the exposure is completed for all the pixel rows 62 at the same timing.

Thereafter, as indicated by the straight line GO, the pixel rows 62 are sequentially selected from the upper end side to the lower end side of the light-receiving surface 60, and in the selected pixel rows 62, electric charges are transferred from the charge holding sections 61B to the floating diffusions 61D. As a result, the imaging signals, which are read from the selected pixel rows 62, are output to the data bus 25.

In a case where the live view image is generated by the digital signal processing section 17 on the basis of the imaging signals output to the data bus 25, as shown by the straight lines DR, the live view image is drawn one line at a time sequentially from the upper end side of the display surface. The captured image data generated on the basis of the imaging signal is stored in the storage medium 21.

Subsequently, the driving control according to the rolling shutter method restarts.

As described above, according to the digital camera of FIG. 1, compared with the driving control according to the global shutter method, under the driving control according to the rolling shutter method, the time necessary for reading of the imaging signal from one pixel row 62 to the signal line 65 is set to be longer.

Therefore, it is possible to prevent occurrence of residual electric charges after transfer from the charge holding sections 61B to the floating diffusions 61D. As a result, it is possible to improve the quality of the live view image displayed through the driving control according to the rolling shutter method.

In a case where the driving control according to the rolling shutter method is performed, the display controller 11B sets the drawing time for drawing one line of the live view image on the display section 23 such that the drawing time is substantially equal to the above-mentioned first time.

According to this configuration, it is possible to synchronize the signal processing of the imaging signals output from the imaging element 5 and the drawing processing of the pixel data rows by the display section 23. Therefore, it is possible to update the live view image at high speed.

In accordance with the imaging mode, the above drawing time may be a value greater than a value which is set as the above-mentioned first time (a lower limit value of the time at which the amount of residual electric charge of the charge holding section 61B is an amount by which the residual electric charge does not affect the imaging quality in a state in which the electric charge is completely transferred from the charge holding section 61B to the floating diffusion 61D).

For example, in the continuous imaging mode in which the still image recording is continuously performed a plurality of times, in a case where priority is given to increasing the number of recorded still images, by increasing the drawing time, the frequency of update of the live view image is lowered.

The digital camera in FIG. 1 has a continuous imaging mode as one of the still imaging modes. Thus, in the continuous imaging mode, in a case where the imaging instruction is issued while the driving control according to the rolling shutter method is performed, in response to this imaging instruction, the driving controller 11A continuously performs the driving control according to the global shutter method N times (N is an integer of 2 or more).

Then, N pieces of the captured image data, which are generated on the basis of the imaging signals output from the imaging element 5 through this driving control performed N times, are stored in the storage medium 21 under the control of the system controller 11.

In the continuous imaging mode, the value of N can be set by a user. Then, in a case where the value of N is equal to or less than the threshold value TH, the display controller 11B sets the drawing time as the lower limit value. In a case where the value of N is greater than the threshold value TH, the display controller 11B sets the drawing time as a value greater than the lower limit value.

As described above, in the continuous imaging mode, in a case where the value of N is greater than the threshold value TH, the driving controller 11A sets the above-mentioned first time on the basis of the drawing time (a value greater than the lower limit value) which is set by the display controller 11B. Specifically, the driving controller 11A sets the first time substantially equal to the drawing time (a value greater than the lower limit value described above).

As described above, in the mode in which the drawing time is long, by setting the first time greater than the lower limit value, it is possible to lower a voltage necessary for driving the imaging element 5 during the driving control according to the rolling shutter method. Therefore, power consumption can be reduced. In addition, it is possible to prevent deterioration in quality of the live view image while increasing the number of continuous shots.

The digital camera has been hitherto taken as an example of an imaging apparatus, but in the following description, an embodiment of a smartphone having a camera as an imaging apparatus will be described.

Figure 7:
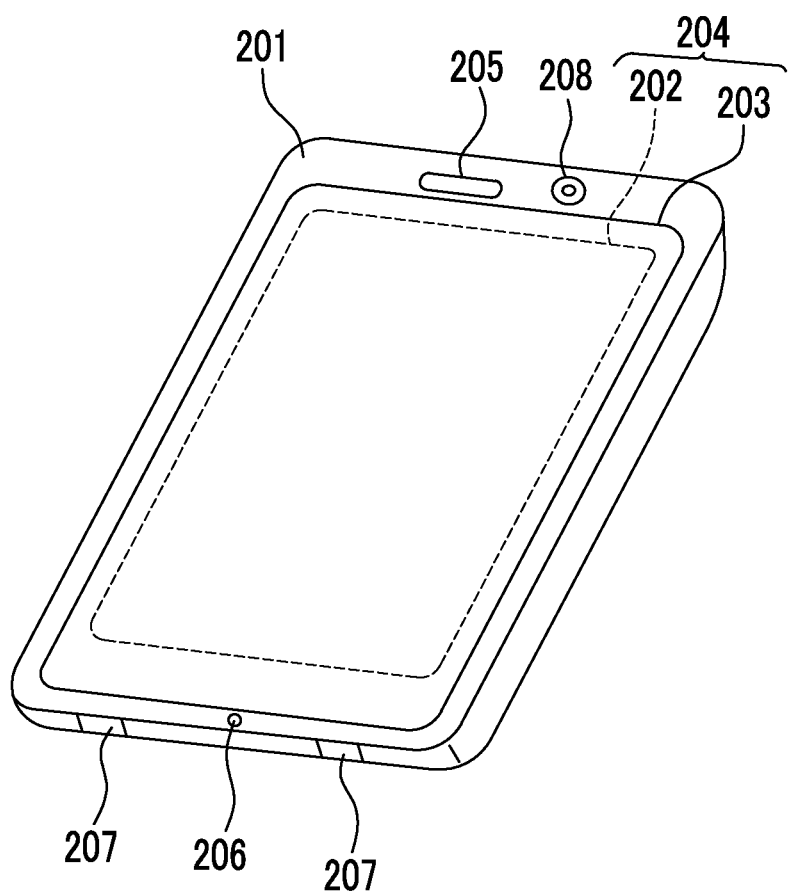
FIG. 7 is a diagram illustrating an appearance of a smartphone 200 which is an embodiment of an imaging apparatus according to an embodiment of the present invention.

FIG. 7 shows an appearance of a smartphone 200 as an imaging apparatus according to the above-mentioned embodiment of the present invention.

The smartphone 200 illustrated in FIG. 7 comprises: a housing 201 that has a flat plate shape; a display panel 202 as a display section on one side of the housing 201; and a display input section 204 into which an operation panel 203 as an input section is integrated.

Further, the housing 201 comprises a speaker 205, a microphone 206, operation sections 207, and a camera section 208.

It should be noted that the configuration of the housing 201 is not limited to this. For example, it may be possible to adopt a configuration in which the input section and the display section are independent, or it may be possible to adopt a configuration having a slide mechanism or a folded structure.

Figure 8:
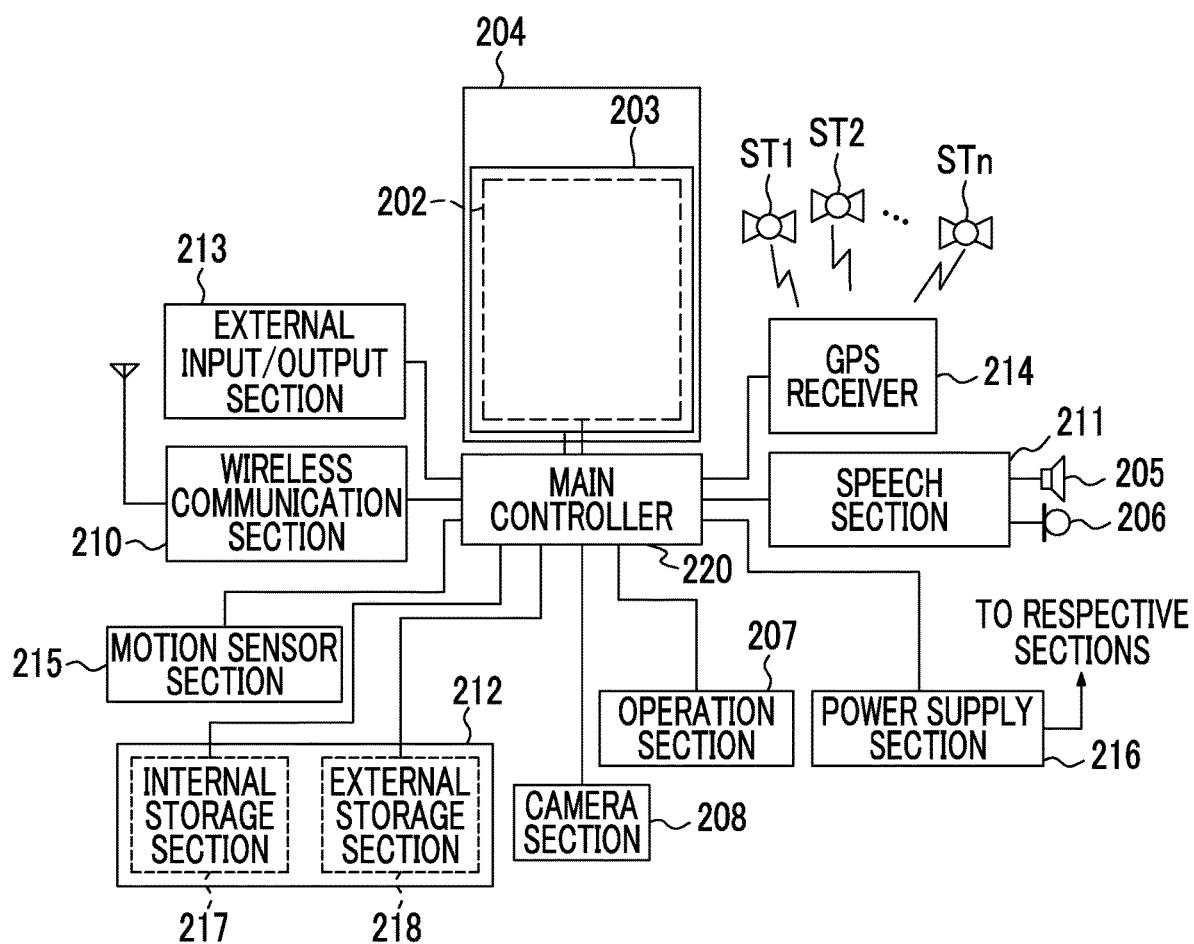
FIG. 8 is a block diagram illustrating a configuration of the smartphone 200 illustrated in FIG. 7.

FIG. 8 is a block diagram illustrating a configuration of the smartphone 200 illustrated in FIG. 7.

As illustrated in FIG. 8, the smartphone comprises, as main components, a wireless communication section 210, a display input section 204, a speech section 211, the operation sections 207, the camera section 208, a storage section 212, an external input/output section 213, a global positioning system (GPS) receiver 214, a motion sensor section 215, a power supply section 216, and a main controller 220.

As the main function of the smartphone 200, there is provided a wireless communication function for performing mobile wireless communication with a base station device BS, which is not shown, through a mobile communication network NW which is not shown.

The wireless communication section 210 performs wireless communication with the base station device BS, which is included in the mobile communication network NW, in accordance with an instruction of the main controller 220. The wireless communication is used to transmit and receive various kinds of file data such as audio data and image data, and e-mail data or to receive web data, streaming data, or the like.

The display input section 204 is a so-called touch panel, and includes the display panel 202 and the operation panel 203. The touch panel displays image (still image and moving image) information, text information, or the like so as to visually transfer the information to a user in accordance with control of the main controller 220, and detects a user operation on the displayed information.

The display panel 202 uses a liquid crystal display (LCD), an organic electro-luminescence display (OELD), or the like as a display device.

The operation panel 203 is a device that is provided for viewing an image which is displayed on a display surface of the display panel 202 and that detects a single pair of coordinates or a plurality of pairs of coordinates at which an operation is performed by a user's finger or a stylus. In a case where such a device is operated by a user's finger or a stylus, the device outputs a detection signal, which is generated due to the operation, to the main controller 220. Subsequently, the main controller 220 detects an operation position (coordinates) on the display panel 202, on the basis of the received detection signal.

As illustrated in FIG. 7, the display panel 202 and the operation panel 203 of the smartphone 200, which is exemplified as the imaging apparatus according to the above-mentioned embodiment of the present invention, are integrated to constitute the display input section 204, and are disposed such that the operation panel 203 completely covers the display panel 202.

In a case where such an arrangement is adopted, the operation panel 203 may have a function of also detecting a user operation in a region other than the display panel 202. In other words, the operation panel 203 may comprise a detection region (hereinafter referred to as a display region) for a part which overlaps with the display panel 202 and a detection region (hereinafter referred to as a non-display region) for the other part at the outer edge which does not overlap with the display panel 202.

It should be noted that a size of the display region and a size of the display panel 202 may completely coincide with each other, but it is not always necessary for both to coincide with each other. Further, the operation panel 203 may include two sensing regions of the outer edge part and the other inside part. A width of the outer edge part is appropriately designed depending on a size of the housing 201 and the like.

In addition, examples of the position detection method adopted for the operation panel 203 may include a matrix switch method, a resistance film method, a surface elastic wave method, an infrared method, an electromagnetic induction method, an electrostatic capacitance method, and the like, and any method may be adopted.

The speech section 211 comprises a speaker 205 or a microphone 206. The speech section 211 converts a sound of a user, which is input through the microphone 206, into audio data, which can be processed in the main controller 220, and outputs the data to the main controller 220, or decodes audio data, which is received by the wireless communication section 210 or the external input/output section 213, and outputs the data from the speaker 205.

Further, as illustrated in FIG. 7, for example, the speaker 205 can be mounted on the same surface as the surface on which the display input section 204 is provided. In addition, the microphone 206 can be mounted on a side surface of the housing 201.

The operation section 207 is a hardware key using a key switch or the like, and receives an instruction from a user. For example, as illustrated in FIG. 7, the operation sections 207 are button type switches which are mounted on the side surface of the housing 201 of the smartphone 200. Each switch is turned on in a case where it is pressed by a finger or the like, and is turned off due to restoring force of a spring in a case where the finger is released.

The storage section 212 stores a control program or control data of the main controller 220, application software, address data in which names, phone numbers, or the like of communication partners are associated, received and transmitted e-mail data, web data which is downloaded by web browsing, or downloaded contents data, and temporarily stores streaming data and the like. Further, the storage section 212 is constituted of an internal storage section 217, which is built into the smartphone, and an external storage section 218 which has a slot for a removable external memory.

In addition, each of the internal storage section 217 and the external storage section 218 composing the storage section 212 is implemented by using a storage medium such as a flash memory type, a hard disk type, a multimedia card micro type, a card type memory (such as a MicroSD (registered trademark) memory), a random access memory (RAM), or a read only memory (ROM).

The external input/output section 213 has a function of an interface with all external devices connected to the smartphone 200. The external input/output section 213 is for communication (such as universal serial bus (USB) or IEEE1394) with other external devices, direct or indirect connection to networks (such as the Internet, wireless LAN, Bluetooth (registered trademark), radio frequency identification (RFID), infrared communication (Infrared Data Association: IrDA) (registered trademark), ultra wideband (UWB) (registered trademark), and ZigBee (registered trademark)), or the like.

Examples of the external devices connected to the smartphone 200 include a wired/wireless headset, a wired/wireless external electric charger, a wired/wireless data port, a memory card which is connected through a card socket, a subscriber identity module (SIM) or user identity module (UIM) card, external audio/video devices which are connected through audio/video input/output (I/O) terminals, external audio/video devices which are connected in a wireless manner, a smartphone which is connected in a wired or wireless manner, a personal computer which is connected in a wired or wireless manner, a PDA which is connected in a wired or wireless manner, an earphone which is connected in a wired or wireless manner, and the like.

The external input/output section 213 may transfer the data, which is transmitted from such external devices, to the main components within the smartphone 200, and to transmit the data within the smartphone 200 to the external devices.

The GPS receiver 214 receives a plurality of GPS signals, which are transmitted from GPS satellites ST1 to STn, in accordance with instructions of the main controller 220, executes positioning calculation processing on the basis of the received GPS signals, and detects a position formed of a latitude, a longitude, and an altitude of the smartphone 200.

The GPS receiver 214 may detect the position by using position information in a case where it is possible to acquire the position information from the wireless communication section 210 or the external input/output section 213 (for example, wireless LAN).

The motion sensor section 215 includes, for example, a triaxial acceleration sensor, and detects physical movement of the smartphone 200, in accordance with an instruction of the main controller 220. By detecting physical movement of the smartphone 200, an acceleration or a direction of the movement of the smartphone 200 is detected. Such a detection result is output to the main controller 220.

The power supply section 216 supplies the respective sections of the smartphone 200 with electric power, which is stored in a battery (not shown), in accordance with an instruction of the main controller 220.

The main controller 220 includes a micro processor, and integrally controls the respective sections of the smartphone 200 by performing an operation on the basis of control data or a control program stored in the storage section 212.

Further, the main controller 220 has an application processing function and a mobile communication control function of controlling the respective sections of a communication system in order to perform data communication or sound communication through the wireless communication section 210.

The application processing function is implemented by an operation of the main controller 220 using application software stored in the storage section 212.

Examples of the application processing function include: an infrared communication function of performing data communication with other devices by controlling the external input/output section 213; an e-mail function of transmitting and receiving e-mails; a web browsing function of browsing web pages; and the like.

Further, the main controller 220 has an image processing function of displaying a video on the display input section 204 and the like, on the basis of image data (still image and moving image data) such as received data or downloaded streaming data.

The image processing function means a function of causing the main controller 220 to decode the image data, apply image processing to the decoding result, and display an image on the display input section 204.

Further, the main controller 220 executes display control for the display panel 202 and operation detection control to detect the user operation through the operation sections 207 and the operation panel 203. Through execution of the display control, the main controller 220 displays an icon for activating application software or a window for displaying a software key such as a scroll bar or creating an e-mail.

In addition, the scroll bar means a software key for receiving an instruction to move a display portion of an image on a large image which cannot be entirely illustrated in the display region of the display panel 202.

Further, through execution of the operation detection control, the main controller 220 detects the user operation performed through the operation section 207, receives an operation performed on the icon or a text input performed in an input field of the window through the operation panel 203, or receives a request to scroll a displayed image through the scroll bar.

Furthermore, the main controller 220 has a touch panel control function performed through execution of the operation detection control. The function determines whether the operation position of the operation panel 203 is in the overlapping part (display region) which overlaps with the display panel 202 or the other part (non-display region) at the outer edge which does not overlap with the display panel 202, and controls the display position of the software key or the sensing region of the operation panel 203.

In addition, the main controller 220 may detect a gesture operation performed on the operation panel 203, and may execute a preset function in response to the detected gesture operation. The gesture operation is not a simple touch operation used in the past. The gesture operation means an operation for drawing a locus with a finger or the like, an operation of specifying a plurality of positions at the same time, or an operation of drawing loci from a plurality of positions to at least one position as a combination of the above-mentioned operations.

The camera section 208 includes the constituent elements other than the external memory controller 20, the storage medium 21, and components other than the operation section 14 in the digital camera illustrated in FIG. 1. A display driver 22 of the camera section 208 drives the display panel 202 instead of the display section 23.

The captured image data, which is generated by the camera section 208, can be stored in the storage section 212, or can be output through the external input/output section 213 or the wireless communication section 210.

In the smartphone 200 illustrated in FIG. 7, the camera section 208 is mounted on the same side as the display input section 204. However, the mounting position of the camera section 208 is not limited to this. The camera section 208 may be mounted on the rear side of the display input section 204.

Further, the camera section 208 can be used in various functions of the smartphone 200. For example, the image acquired by the camera section 208 can be displayed on the display panel 202. The image of the camera section 208 can be used as one of the operation inputs of the operation panel 203.

Further, in a case where the GPS receiver 214 detects a position, the GPS receiver 214 may detect the position with reference to an image obtained from the camera section 208. Further, it may be possible to determine a direction of an optical axis of the camera section 208 of the smartphone 200 or determine a current usage environment, using the GPS receiver 214 in a combination with the triaxial acceleration sensor or without using the triaxial acceleration sensor, with reference to the image acquired from the camera section 208. Needless to say, the image acquired from the camera section 208 may be used in the application software.

Otherwise, the position information acquired by the GPS receiver 214, the sound information acquired by the microphone 206 (or text information obtained through sound text conversion performed by the main controller or the like), posture information acquired by the motion sensor section 215, and the like may be added to the image data of the still image or the moving image, and the image data may be stored in the storage section 212, or may be output through the external input/output section 213 or the wireless communication section 210.

As described above, the present description discloses the following items.

(1) An imaging apparatus comprising: a MOS type imaging element that has a plurality of pixels each including a photoelectric conversion element and a charge holding section, which holds an electric charge generated by the photoelectric conversion element and from which a signal corresponding to the electric charge is read by a reading circuit, and includes a plurality of pixel rows each consisting of a plurality of the pixels arranged in one direction; and a driving controller that selectively performs driving control according to a global shutter method of simultaneously resetting the respective photoelectric conversion elements of the plurality of pixels to start exposure of the plurality of pixels, simultaneously transferring electric charges accumulated in the respective photoelectric conversion elements of the plurality of pixels to the charge holding sections to terminate the exposure, and sequentially reading signals corresponding to the electric charges held in the charge holding section for each pixel row, and driving control according to a rolling shutter method of resetting the photoelectric conversion elements in the pixel rows to start exposure of the photoelectric conversion elements in the pixel rows, transferring electric charges accumulated in the photoelectric conversion elements of the pixel rows to the charge holding sections to terminate the exposure, and sequentially performing driving for reading signals corresponding to the electric charges held in the charge holding sections while changing the pixel rows, wherein an imaging mode for performing the driving control according to the global shutter method while continuously performing the driving control according to the rolling shutter method, the driving controller makes a first time, which is necessary for reading the signal obtained from one of the pixel rows under the driving control according to the rolling shutter method, longer than a second time which is necessary for reading the signal obtained from one of the pixel rows under the driving control according to the global shutter method.

(2) The imaging apparatus according to (1), further comprising a display controller that causes a display section to display a live view image generated on the basis of signals which are sequentially output from the imaging element through the driving control according to the rolling shutter method in the imaging mode, wherein one of the first time and a drawing time necessary for drawing one line of the live view image on the display section is determined on the basis of the other of the first time and the drawing time.

(3) The imaging apparatus according to (2), wherein the display controller sets the drawing time on the basis of the first time.

(4) In the imaging apparatus according to (2) or (3), wherein the display controller sets the drawing time substantially equal to the first time.

(5) The imaging apparatus according to (2), wherein the imaging mode is a mode for continuously performing a plurality of times the driving control according to the global shutter method in response to an imaging instruction issued while performing the driving control according to the rolling shutter method, and storing a plurality of captured image data pieces, which are generated on the basis of the signals read from the imaging element through the driving control performed the plurality of times, in a storage medium, wherein the display controller lengthens the drawing time, as compared with a case where the number of operations of the driving control performed in response to the imaging instruction is equal to or less than a threshold value, in a case where the number of operations is greater than the threshold value, and wherein the driving controller sets the first time on the basis of the drawing time.

(6) In the imaging apparatus according to (2) or (5), wherein the driving controller sets the first time substantially equal to the drawing time.

(7) An operation method of the imaging apparatus including a MOS type imaging element that has a plurality of pixels each including a photoelectric conversion element and a charge holding section, which holds an electric charge generated by the photoelectric conversion element and from which a signal corresponding to the electric charge is read by a reading circuit, and includes a plurality of pixel rows each consisting of a plurality of the pixels arranged in one direction, the method comprising a driving control step of selectively performing driving control according to a global shutter method of simultaneously resetting the respective photoelectric conversion elements of the plurality of pixels to start exposure of the plurality of pixels, simultaneously transferring electric charges accumulated in the respective photoelectric conversion elements of the plurality of pixels to the charge holding sections to terminate the exposure, and sequentially reading signals corresponding to the electric charges held in the charge holding section for each pixel row, and driving control according to a rolling shutter method of resetting the photoelectric conversion elements in the pixel rows to start exposure of the photoelectric conversion elements in the pixel rows, transferring electric charges accumulated in the photoelectric conversion elements of the pixel rows to the charge holding sections to terminate the exposure, and sequentially performing driving for reading signals corresponding to the electric charges held in the charge holding sections while changing the pixel rows, wherein an imaging mode for performing the driving control according to the global shutter method while continuously performing the driving control according to the rolling shutter method, in the driving control step, a first time, which is necessary for reading the signal obtained from one of the pixel rows under the driving control according to the rolling shutter method, is made longer than a second time which is necessary for reading the signal obtained from one of the pixel rows under the driving control according to the global shutter method.

(8) The operation method of the imaging apparatus according to (7), further comprising a display control step of causing a display section to display a live view image generated on the basis of signals which are sequentially output from the imaging element through the driving control according to the rolling shutter method in the imaging mode, wherein one of the first time and a drawing time necessary for drawing one line of the live view image on the display section is determined on the basis of the other of the first time and the drawing time.

(9) The operation method of the imaging apparatus according to (8), wherein in the display control step, the drawing time is set on the basis of the first time.

(10) The operation method of the imaging apparatus according to (8) or (9), wherein in the display control step, the drawing time is set to be substantially equal to the first time.

(11) The operation method of the imaging apparatus according to (8), wherein the imaging mode is a mode for continuously performing a plurality of times the driving control according to the global shutter method in response to an imaging instruction issued while performing the driving control according to the rolling shutter method, and storing a plurality of captured image data pieces, which are generated on the basis of the signals read from the imaging element through the driving control performed the plurality of times, in a storage medium, wherein in the display control step, in a case where the number of operations of the driving control performed in response to the imaging instruction is greater than a threshold value, as compared with a case where the number of operations is equal to or less than a threshold value, the drawing time is lengthened, and wherein in the driving control step, the first time is set on the basis of the drawing time.

(12) In the operation method of the imaging apparatus according to (8) or (11), wherein in the driving control step, the first time is set to be substantially equal to the drawing time.

(13) An operation program of the imaging apparatus including a MOS type imaging element that has a plurality of pixels each including a photoelectric conversion element and a charge holding section, which holds an electric charge generated by the photoelectric conversion element and from which a signal corresponding to the electric charge is read by a reading circuit, and includes a plurality of pixel rows each consisting of a plurality of the pixels arranged in one direction, the program causing a computer to execute a driving control step of selectively performing driving control according to a global shutter method of simultaneously resetting the respective photoelectric conversion elements of the plurality of pixels to start exposure of the plurality of pixels, simultaneously transferring electric charges accumulated in the respective photoelectric conversion elements of the plurality of pixels to the charge holding sections to terminate the exposure, and sequentially reading signals corresponding to the electric charges held in the charge holding section for each pixel row, and driving control according to a rolling shutter method of resetting the photoelectric conversion elements in the pixel rows to start exposure of the photoelectric conversion elements in the pixel rows, transferring electric charges accumulated in the photoelectric conversion elements of the pixel rows to the charge holding sections to terminate the exposure, and sequentially performing driving for reading signals corresponding to the electric charges held in the charge holding sections while changing the pixel rows, wherein in an imaging mode for performing the driving control according to the global shutter method while continuously performing the driving control according to the rolling shutter method, in the driving control step, a first time, which is necessary for reading the signal obtained from one of the pixel rows under the driving control according to the rolling shutter method, is made longer than a second time which is necessary for reading the signal obtained from one of the pixel rows under the driving control according to the global shutter method.

According to the present invention, it is possible to prevent deterioration in quality of the captured image in a case where imaging is performed using the driving according to the global shutter method and the driving according to the rolling shutter method in combination.

The present invention has been hitherto described with reference to the specific embodiments. However, the present invention is not limited to the embodiments, and may be modified into various forms without departing from the technical scope of the present invention.

This application is on the basis of Japanese Patent Application (JP2016-185291A) filed on Sep. 23, 2016, the content of which is incorporated herein by reference.

EXPLANATION OF REFERENCES

1: imaging lens
2: stop
4: lens controller
5: imaging element
40: lens device
60: light-receiving surface
61: pixel
61A: photoelectric conversion element
61B: charge holding section
61C: charge transfer section
61D: floating diffusion
61E: reading circuit
62: pixel row
63: driving circuit
64: signal processing circuit
65: signal line
70: N-type substrate
71: P well layer
72: reading electrode
73: N-type impurity layer
74: P-type impurity layer 75: region
76: transfer electrode
77: reset transistor
78: output transistor
79: selection transistor
X: row direction
Y: column direction
8: lens driving section
9: stop driving section
10: imaging element driving section
11: system controller
11A: driving controller
11B: display controller
14: operation section
17: digital signal processing section
20: external memory controller
21: storage medium
22: display driver
23: display section
24: control bus
25: data bus
RR, GR: straight line indicating reset timing
RO: straight line indicating exposure end and signal reading timing
GS: straight line indicating exposure end timing
GO: straight line indicating signal reading timing
DR: straight line indicating drawing timing
200: smartphone
201: housing
202: display panel
203: operation panel
204: display input section
205: speaker
206: microphone
207: operation section
208: camera section
210: wireless communication section
211: speech section
212: storage section
213: external input/output section
214: GPS receiver
215: motion sensor section
216: power supply section
217: internal storage section
218: external storage section
220: main controller
ST1 to STn: GPS satellite

What is claimed is:

1. An imaging apparatus comprising:
a MOS type imaging element that has a plurality of pixels each comprising a photoelectric conversion element and a charge holding section which holds an electric charge generated by the photoelectric conversion element and from which a signal corresponding to the electric charge is read by a reading circuit, and comprises a plurality of pixel rows each consisting of a plurality of the pixels arranged in one direction; and
a driving controller that selectively performs driving control according to a global shutter method of simultaneously resetting the respective photoelectric conversion elements of the plurality of pixels to start exposure of the plurality of pixels, simultaneously transferring electric charges accumulated in the respective photoelectric conversion elements of the plurality of pixels to the charge holding sections to terminate the exposure, and sequentially reading signals corresponding to the electric charges held in the charge holding section for each of the pixel rows, and driving control according to a rolling shutter method of resetting the photoelectric conversion elements in the pixel rows to start exposure of the photoelectric conversion elements in the pixel rows, transferring electric charges accumulated in the photoelectric conversion elements of the pixel rows to the charge holding sections to terminate the exposure, and sequentially performing driving for reading signals corresponding to the electric charges held in the charge holding sections while changing the pixel rows,
wherein in an imaging mode for performing the driving control according to the global shutter method while continuously performing the driving control according to the rolling shutter method, the driving controller makes a first time, which is required for reading the signal obtained from one of the pixel rows under the driving control according to the rolling shutter method, longer than a second time which is required for reading the signal obtained from one of the pixel rows under the driving control according to the global shutter method.

2. The imaging apparatus according to claim 1, further comprising
a display controller that causes a display section to display a live view image generated based on signals which are sequentially output from the imaging element through the driving control according to the rolling shutter method in the imaging mode,
wherein one of the first time and a drawing time which is required for drawing one line of the live view image on the display section is determined based on other of the first time and the drawing time.

3. The imaging apparatus according to claim 2,
wherein the display controller sets the drawing time based on the first time.

4. The imaging apparatus according to claim 2,
wherein the display controller sets the drawing time substantially equal to the first time.

5. The imaging apparatus according to claim 3,
wherein the display controller sets the drawing time substantially equal to the first time.

6. The imaging apparatus according to claim 2,
wherein the imaging mode is a mode for continuously performing a plurality of times of the driving control according to the global shutter method in response to an imaging instruction issued while performing the driving control according to the rolling shutter method, and storing a plurality of captured image data pieces, which are generated based on the signals read from the imaging element through the plurality of times of the driving control, in a storage medium,
wherein the display controller lengthens the drawing time, as compared with a case where number of operations of the driving control performed in response to the imaging instruction is equal to or less than a threshold value, in a case where the number of operations is greater than the threshold value, and
wherein the driving controller sets the first time based on the drawing time.

7. The imaging apparatus according to claim 2,
wherein the driving controller sets the first time substantially equal to the drawing time.

8. The imaging apparatus according to claim 6,
wherein the driving controller sets the first time substantially equal to the drawing time.

9. An operation method of the imaging apparatus including a MOS type imaging element that has a plurality of pixels each including a photoelectric conversion element and a charge holding section, which holds an electric charge generated by the photoelectric conversion element and from which a signal corresponding to the electric charge is read by a reading circuit, and includes a plurality of pixel rows each consisting of a plurality of the pixels arranged in one direction, the method comprising a driving control step of selectively performing driving control according to a global shutter method of simultaneously resetting the respective photoelectric conversion elements of the plurality of pixels to start exposure of the plurality of pixels, simultaneously transferring electric charges accumulated in the respective photoelectric conversion elements of the plurality of pixels to the charge holding sections to terminate the exposure, and sequentially reading signals corresponding to the electric charges held in the charge holding section for each of the pixel rows, and driving control according to a rolling shutter method of resetting the photoelectric conversion elements in the pixel rows to start exposure of the photoelectric conversion elements in the pixel rows, transferring electric charges accumulated in the photoelectric conversion elements of the pixel rows to the charge holding sections to terminate the exposure, and sequentially performing driving for reading signals corresponding to the electric charges held in the charge holding sections while changing the pixel rows, wherein in an imaging mode for performing the driving control according to the global shutter method while continuously performing the driving control according to the rolling shutter method, in the driving control step, a first time, which is required for reading the signal obtained from one of the pixel rows under the driving control according to the rolling shutter method, is made longer than a second time which is required for reading the signal obtained from one of the pixel rows under the driving control according to the global shutter method.

10. The operation method of the imaging apparatus according to claim 9, further comprising a display control step of causing a display section to display a live view image generated based on signals which are sequentially output from the imaging element through the driving control according to the rolling shutter method in the imaging mode, wherein one of the first time and a drawing time which is required for drawing one line of the live view image on the display section is determined based on other of the first time and the drawing time.

11. The operation method of the imaging apparatus according to claim 10, wherein in the display control step, the drawing time is set based on the first time.

12. The operation method of the imaging apparatus according to claim 10, wherein in the display control step, the drawing time is set to be substantially equal to the first time.

13. The operation method of the imaging apparatus according to claim 11, wherein in the display control step, the drawing time is set to be substantially equal to the first time.

14. The operation method of the imaging apparatus according to claim 10, wherein the imaging mode is a mode for continuously performing a plurality of times of the driving control according to the global shutter method in response to an imaging instruction issued while performing the driving control according to the rolling shutter method, and storing a plurality of captured image data pieces, which are generated based on the signals read from the imaging element through the plurality of times of the driving control, in a storage medium, wherein in the display control step, in a case where the number of operations of the driving control performed in response to the imaging instruction is greater than a threshold value, as compared with a case where the number of operations is equal to or less than a threshold value, the drawing time is lengthened, and wherein in the driving control step, the first time is set based on the drawing time.

15. The operation method of the imaging apparatus according to claim 10, wherein in the driving control step, the first time is set to be substantially equal to the drawing time.

16. The operation method of the imaging apparatus according to claim 14, wherein in the driving control step, the first time is set to be substantially equal to the drawing time.

17. A non-transitory computer readable medium storing an operation program of the imaging apparatus including a MOS type imaging element that has a plurality of pixels each including a photoelectric conversion element and a charge holding section, which holds an electric charge generated by the photoelectric conversion element and from which a signal corresponding to the electric charge is read by a reading circuit, and includes a plurality of pixel rows each consisting of a plurality of the pixels arranged in one direction, the program causing a computer to execute a driving control step of selectively performing driving control according to a global shutter method of simultaneously resetting the respective photoelectric conversion elements of the plurality of pixels to start exposure of the plurality of pixels, simultaneously transferring electric charges accumulated in the respective photoelectric conversion elements of the plurality of pixels to the charge holding sections to terminate the exposure, and sequentially reading signals corresponding to the electric charges held in the charge holding section for each of the pixel rows, and driving control according to a rolling shutter method of resetting the photoelectric conversion elements in the pixel rows to start exposure of the photoelectric conversion elements in the pixel rows, transferring electric charges accumulated in the photoelectric conversion elements of the pixel rows to the charge holding sections to terminate the exposure, and sequentially performing driving for reading signals corresponding to the electric charges held in the charge holding sections while changing the pixel rows, wherein in an imaging mode for performing the driving control according to the global shutter method while continuously performing the driving control according to the rolling shutter method, in the driving control step, a first time, which is required for reading the signal obtained from one of the pixel rows under the driving control according to the rolling shutter method, is made longer than a second time which is required for reading the signal obtained from one of the pixel rows under the driving control according to the global shutter method.

\* \* \* \* \*